July 11, 1950 — E. ZENKO — 2,514,825
HAND TRUCK WITH LIFT PLATFORM
Filed May 28, 1947 — 2 Sheets-Sheet 1
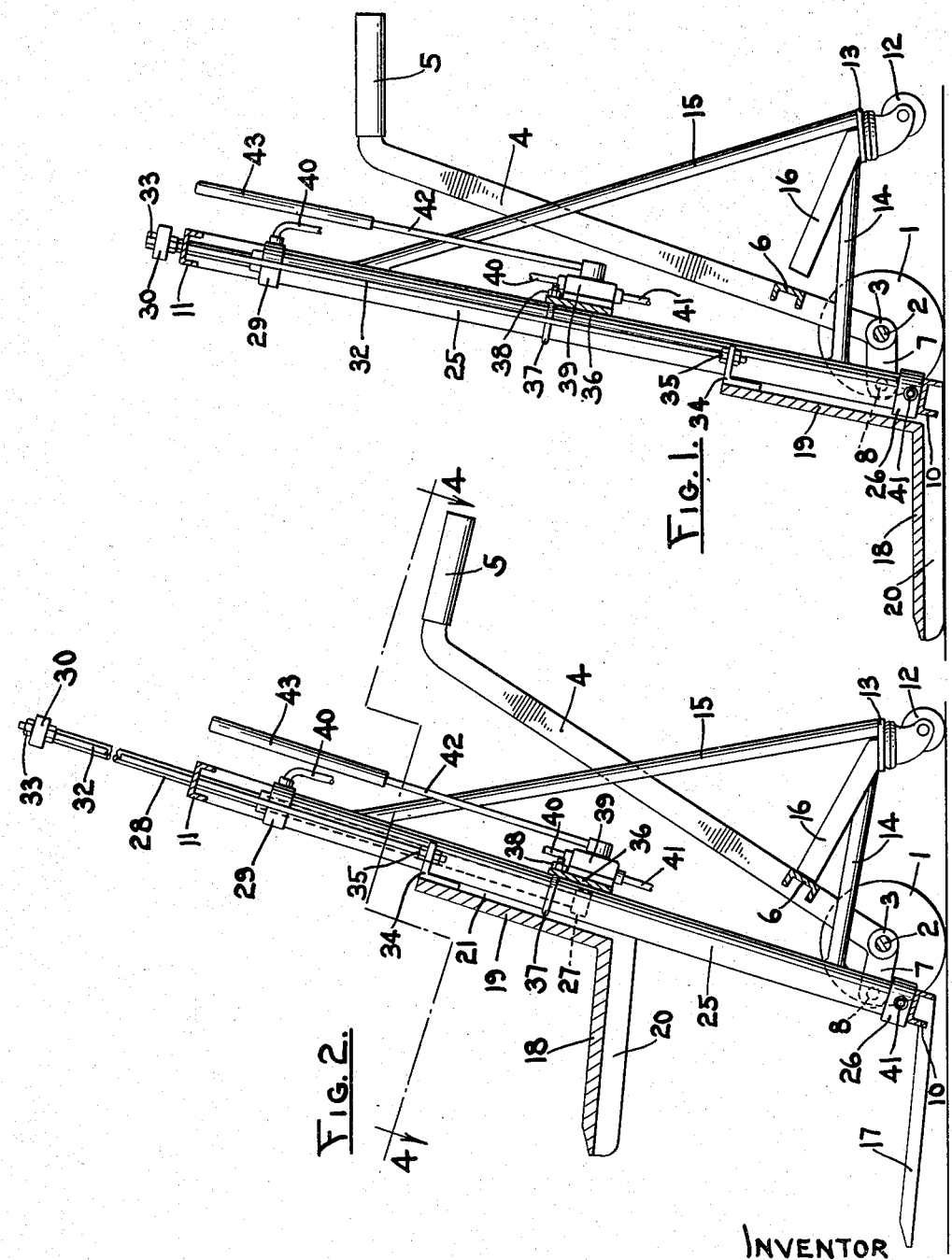
INVENTOR
EDWARD ZENKO
By Lennie L. Parker
ATTORNEY July 11, 1950 E. ZENKO 2,514,825
HAND TRUCK WITH LIFT PLATFORM
Filed May 28, 1947 2 Sheets-Sheet 2
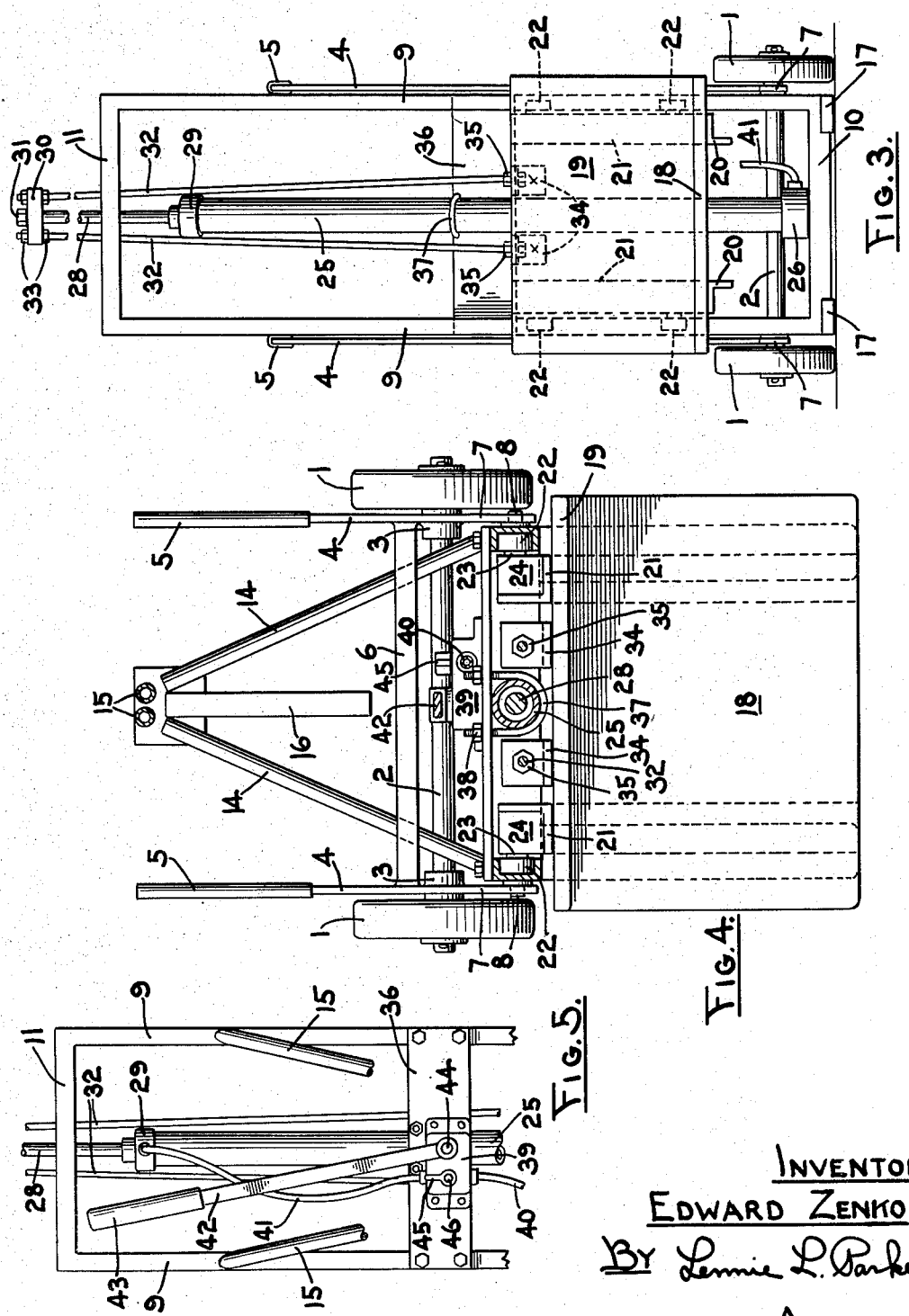
INVENTOR
EDWARD ZENKO
BY Lennie L. Parker
ATTORNEY Patented July 11, 1950

2,514,825

UNITED STATES PATENT OFFICE 2,514,825

HAND TRUCK WITH LIFT PLATFORM

Edward Zenko, Grand Haven, Mich.

Application May 28, 1947, Serial No. 751,002

8 Claims. (Cl. 214—100)

This invention relates to a hand truck and more particularly to a lifting or hoisting conveying hand operated truck.

The primary purpose of the present invention is to provide a hand operated conveying truck incorporating a hoist or lift to facilitate easy loading and unloading thereof. Other objects of the invention are to provide a hand truck in which: a platform is provided movable to a position close to the floor for easy loading or unloading at floor lever and movable, under power, to elevated positions for easy loading or unloading to and from these positions, for instance, the bed of a machine or a work bench; the truck is easily and quickly shifted from loading position to traveling or conveying position; the platform is easily hoisted and lowered; the construction is simple and economical to manufacture.

Other objects and advantages of the present invention will become apparent from the following description taken in connection with the accompanying drawings, in which:

Figure 1 is a central vertical longitudinal sectional view through a hand truck made in accordance with the construction of my invention with the truck in loading position at floor level.

Figure 2 is a similar view of the hand truck shown in travelling position with the platform in raised position.

Figure 3 is a front elevational view of the hand truck.

Figure 4 is a horizontal transverse sectional view through the hand truck taken along line 4—4 in Figure 2 looking in the direction of the arrows.

Figure 5 is a fragmentary rear elevational view of the upper portion of the truck structure.

Referring to the details of the drawing in which like reference numerals refer to like parts throughout the several views, Numeral 1 refers to a pair of wheels on which the truck is moved and these wheels are rotatably mounted on an axle 2 rotatably extending through the bearings 3 formed as part of the handle members 4. These handles are provided with hand grips 5 at their upper horizontal terminal ends and with the horizontal stop channel 6 extending therebetween, and are also provided with the relatively short arms 7 extending forwardly substantially horizontal from the bearings 3. The arms 7 are pivotally attached to the pivot pins 8, secured to and extending outwardly from the side channel frame members 7 forming part of a rectangular main frame also having a lower horizontal channel member 10 and an upper horizontal channel member 11.

A trailing or self-alining caster 12 is supported on the main frame by securing the caster to the bottom side of a substantially square plate 13 with a pair of horizontal diverging tubes 14 secured at their ends to the plate and at their opposite ends secured to the rear side of the frame members 9. Another pair of tubes 15 are secured at their lower ends to the upper side of the plate 13 and extend upwardly, forwardly and divergingly with their upper ends secured to the rear side of the main frame member 9. Thus the caster is attached to the main frame. A stop member 16 is secured to the upper side of the plate 13 and the outer front end thereof is adapted to be engaged by the cross stop member 6 by movement of the handles 4.

A pair of spaced parallel fork members 17 are secured to and extend forwardly from the main frame member 10.

A horizontal platform 18, with its upright back member 19, is adapted to receive articles and goods to be transported. The platform is provided at its under side with the angle member reinforcements 20 and the back member 19 has the angular members 21 secured thereto. The platform is adapted to be moved vertically along the main frame by providing a pair of rollers 22 adapted to roll internally of the channel frame members 9. These rollers are rotatably supported in bearing members 24 secured to the angle members 21. Thus the platform moves vertically on a frictionless carriage.

Means are provided for hydraulically raising and lowering the platform which construction includes a hydraulic cylinder 25, the closed head 26 of which is attached to the lower horizontal main frame member 10. This cylinder is provided with a piston 27 with an attached piston rod 28 moving through the head 29 of the cylinder. The piston rod is also slidably received through an opening in the upper horizontal channel main frame member 11 and extends thereabove.

A crosshead 30 is attached to the upper end of the piston rod 38 by means of the nut 31. A pair of rods 32 are attached at their upper ends to the crosshead 30 by means of the nuts 33 and are attached at their lower ends to the angle brackets 34, by means of the nuts 35. These angle brackets are welded or otherwise attached to the rear side of the back member 19. Thus by operation of the hydraulic cylinder, piston and rods the platform is moved vertically.

A cross member 36 is attached horizontally between and to the rear sides of the frame members 9. The hydraulic cylinder is secured to this cross member 26 with the U bolt 37 extending around the cylinder, extending through openings in the cross member and held by means of the nuts 38.

A hydraulic pump 39 is attached to the rear face of the cross member 36 and is provided with a low pressure conduit 40 connected to the upper end of the cylinder and a high pressure conduit 41 connected to the lower end of the cylinder.

The hydraulic pump is provided with an operating lever 42 having a hand grip 43 and connected to a rock shaft 44 of the pump. By operation of the lever 42 oil is pumped from the upper end of the cylinder into the lower end thereof thus raising the platform. A bypass lever 45 is connected to a rock shaft 46, by the operation of which the oil is allowed to bypass the pump allowing the oil to pass freely from the lower end of the cylinder to the upper end of the cylinder by the gravitational lowering of the platform.

In use the hand truck is in a position as shown in Figure 1 for loading from the floor. In this position the handles 4 are released allowing the main frame to drop with the frame member 10 resting on this floor. In this position the center of gravity of this main frame assembly is ahead of the lower rear corner of the lower frame member 10 causing the main frame to rest on the forks 17 with the caster 12 raised from the floor. In this position with the platform 18 close to this floor, heavy articles, tools and pans of articles may be easily slid onto the platform.

If it is desired to load the truck from the height of a work bench or the bed of a machine, the lever 42 is reciprocated, with the bypass control 45 in closed position, whereby the oil is pumped from the upper end of the cylinder to the lower end. This moves the piston 27, piston rod 28, rods 32 and the platform 18 upwardly until the desired height is reached. The article to be moved from the bench or machine bed is easily slid onto the platform 18 the same height thereof.

In order to move or transport the truck the operator grasps the two grips 5 of the handle 4 and moves them downwardly and rearwardly around the axle 2. The first pivotal motion of the handles 4 moves the short arm upwardly, lifting the main frame 9—10—11 pivotal thereon on the pins 8. This lifts the forks 17 off from the floor a short distance. The cross member 6 secured between the handles 4 engages the outer forward end of the stop member 16 and further rearward and downward motion of the handles of the operator moves the caster 12 downwardly into contact with the floor. Thus the truck and load have a three point supporting contact with the floor. With the truck in this position the operator may push the truck to the desired destination while continually pushing downwardly on the handles.

When the desired destination is reached the operator releases his downward pressure on the handles 4, which motion first, pivots the main frame around the axle 2 raising the caster 13 from the floor and lowering the main frame until the bottom rear corner of the lower frame member 10 rests on the floor. Then the main frame pivots on the frame member 10 until the forks 17 rest flatly on the floor. The platform 18 is thereafter raised or lowered to the desired height for delivery of the article or articles from the platform to the floor, or to a work bench or the bed of a machine.

The platform may be lowered by moving the bypass lever 45 which permits the oil to flow from the lower end of the cylinder to the upper end thereof by the weight of the platform and other parts supported on the piston rod 28. The platform may be stopped at any desired position during the lowering thereof by moving the bypass lever 48 to closed position.

It will be noted from the foregoing description that I have invented a hand operated fork truck that is simple and easy to operate with the minimum of effort on the part of the operator. The platform is easily hoisted or lowered to the desired elevation either for loading or unloading of articles to and from the platform at any desired height.

Having thus described my one construction of my invention it is considered that various alterations may be made in the construction thereof without departing from the spirit of the invention, the scope thereof being defined in the appended claims.

I claim:

1. A truck comprising spaced wheels on an axle, spaced operating handles pivotally attached to the axle each having a horizontally forwardly extending short arm, a main frame pivotally attached between the short arms, means extending forwardly of the main frame adapted to rest on the floor for holding the main frame in substantially vertical position, rolling means extending rearwardly of the main frame adapted to rest on the floor during transportation thereof for holding the main frame substantially vertical, a horizontal platform vertically movable on the main frame and means for moving the platform vertically on the main frame.

2. A truck comprising spaced wheels on an axle, spaced operating handles pivotally attached to the axle each having a horizontally forwardly extending short arm, a main frame pivotally attached between the short arms, means extending forwardly of the bottom edge of the main frame adapted to rest on the floor during the loading thereof for holding the main frame substantially in vertical position, means attached to and extending rearwardly of the main frame adapted to rest on the floor during transportation thereof for holding the main frame substantially vertical, a coacting stop between the spaced operating handles and the rearwardly extending main frame supporting means, a horizontal platform vertically movable on the main frame and means for causing the said movement.

3. A truck comprising a pair of spaced wheels on an axle adapted to roll on a floor, spaced operating handles pivotally attached to the axle each having a horizontally forwardly extending short arm, a forwardly and rearwardly tiltable main frame pivotally connected between the short arms, means extending forwardly of the main frame adapted to rest on the floor during a forwardly tilted loading position of the main frame, and rolling means extending rearwardly of the main frame adapted to rest on the floor during a rearwardly tilted transporting position of the main frame with the forwardly extending floor engaging means raised from the floor.

4. A truck comprising a floor supported movable supporting member, and operating handle pivotally connected to the supporting member having an integral horizontally forwardly extending short arm, a forwardly and rearwardly tiltable main frame pivotally connected to the forward end of the short arm, means extending horizontally forwardly from the main frame adapted to engage the floor during the forwardly tilted loading position of the main frame, rolling means extending rearwardly from the main frame adapted to be spaced vertically from the floor during the loading position of the main frame and adapted to engage the floor during the rearwardly tilted transporting position of the main frame with the forwardly extending floor engaging means spaced vertically from the floor.

5. A truck comprising spaced wheels on an axle adapted to roll on a floor, an operating handle pivotally connected to the axle extending upwardly and rearwardly therefrom, having a short arm extending horizontally forward therefrom, a forwardly and rearwardly tiltable main frame pivotally connected to the forward end of the short arm extending upwardly and slightly rearwardly therefrom, a fork member secured to the main frame extending horizontally forwardly therefrom adapted to engage the floor forwardly of the main frame when the main frame is tilted forwardly in loading position, a caster secured to the main frame located rearwardly thereof in a position to engage the floor rearwardly of the main frame when the main frame is rearwardly tilted to transporting position with the fork member in raised position above the floor.

6. A hand truck comprising spaced wheels on an axle adapted to roll on a floor, an operating handle pivotally connected to the axle extending upwardly and rearwardly therefrom having a short arm extending horizontally forward therefrom, a forwardly and rearwardly tiltable main frame pivotally connected to the forward end of the short arm extending upwardly and slightly rearwardly therefrom, a caster secured rearwardly of the main frame in which it normally rests in its rearwardly tilted transporting position, a fork member secured to the lower end of the main frame extending horizontally forwardly and slightly upwardly therefrom adapted to engage the floor when the main frame is tilted forwardly in loading position with the caster raised from the floor.

7. A hand truck comprising spaced wheels rotatably mounted on an axle and adapted to roll on a floor, an operating handle pivotally connected to the axle extending upwardly and rearwardly therefrom with a short arm extending horizontally forwardly therefrom, a forwardly and rearwardly tiltable main frame pivotally connected to the outer end of the short arm, a caster supported rearwardly of the main frame adapted to engage the floor when the main frame is rearwardly tilted, stop means engageable between the main frame and the operating handle to tilt the main frame rearwardly on rearward pivoting motion of the handle, and fork means secured to the lower end of the main frame extending horizontally forward and slightly upwardly therefrom adapted to engage the floor on forward pivoting of the operating handle and forward tilting of the main frame.

8. A hand truck comprising spaced wheels rotatably mounted on an axle for forward movement on a floor, an operating handle pivotally mounted on the axle extending upwardly and rearwardly therefrom rotatable to a forward and rearward position, a short arm secured to the operating handle extending horizontally forwardly therefrom, a main frame pivotally mounted on the outer end of the short arm pivotally to a forward and rearward tilted position, a caster supported on the main frame and located rearwardly therefrom, stop means between the operating handle and the main frame engageable on rearward pivoting motion of the operating handle moving the caster into floor engagement with the main frame tilted rearwardly in transposition, a fork secured to the lower end of the main frame spaced vertically from the floor on rearward rotative positioning of the operating handle and extending horizontally forwardly and slightly upwardly from the main frame, and the fork engageable with the floor on forward pivoting of the operating handle lowering the fork to the floor and forward tilting of the main frame tilting the fork to horizontally extending position.

EDWARD ZENKO.

REFERENCES CITED

The following references are of record in the file of this patent:

UNITED STATES PATENTS

| Number | Name | Date |
|---|---|---|
| 429,140 | Mallory | June 3, 1890 |
| 1,018,260 | Myrholm | Feb. 20, 1912 |
| 1,168,008 | Kleine | Jan. 11, 1916 |
| 1,591,766 | Mayer | July 6, 1926 |
| 2,030,925 | Lea | Feb. 18, 1936 |
| 2,398,584 | Goodrich | Apr. 16, 1946 |
| 2,415,655 | Reinert | Feb. 11, 1947 |
| 2,431,096 | Van Den Bergh et al. | Feb. 11, 1947 |